United States Patent [19]

Ichikawa

[11] 4,226,081

[45] Oct. 7, 1980

[54] ELECTRONIC TIMEPIECE

[75] Inventor: Singo Ichikawa, Sayama, Japan

[73] Assignee: Citizen Watch Co., Ltd., Tokyo, Japan

[21] Appl. No.: 919,675

[22] Filed: Jun. 27, 1978

[30] Foreign Application Priority Data

Jul. 1, 1977 [JP] Japan .................................. 52/78521

[51] Int. Cl.$^2$ ................................................ G04C 3/00

[52] U.S. Cl. ....................................... 368/66; 340/636

[58] Field of Search ............... 58/4A, 19 R, 23 R, 38, 58/50 R, 50 A, 57, 57.5, 58, 152 H, 23 C, 23 BA; 235/92 T; 307/296; 313/109, 113, 186, 187; 340/636

[56] References Cited

U.S. PATENT DOCUMENTS

| | | | |
|---|---|---|---|
| R. 29637 | 6/1978 | Takamune | 58/23 BA |
| 3,339,155 | 8/1967 | Camenzind | 331/113 R |
| 4,094,137 | 6/1978 | Morokawa | 58/23 BA |

*Primary Examiner*—Edith S. Jackmon

*Attorney, Agent, or Firm*—Sherman & Shalloway

[57] ABSTRACT

An electronic timepiece which makes use of a lithium battery having a high electric power capacity is disclosed. The timepiece comprises in combination a voltage converter and a voltage detection circuit. The output signal delivered from the voltage detection circuit causes the output voltage from the voltage converter to change in response to the battery voltage so as to reduce electric power consumed by electric circuits.

8 Claims, 3 Drawing Figures

ELECTRONIC TIMEPIECE

BACKGROUND OF THE INVENTION

1. Field of the Invention

This invention relates to an electronic timepiece which consumes small amount of electric power.

2. Description of the Prior Art

In electronic timepieces, electric power of a battery is consumed by a quartz oscillation circuit, frequency divider, pulse motor, time display device composed of electro-optical display elements and leakage current loss of a battery. The operative life of the electronic timepiece is determined by the relation between the above mentioned consumed electric power and the current capacity of the battery.

In the case of producing the electronic timepieces in commercial scale, it is important to put stress not only on the characteristic thereof but also on the above mentioned operative life and design.

The recent techniques render it possible to improve the characteristic of the pulse motor and to rationalize the design of wheel mechanism such that the electric power required for driving the timepiece is decreased from 10 $\mu$W required in several years ago to 1 $\mu$W required at present. The electric power required for displaying times of the electronic timepiece with the aid of a liquid crystal, for example, is at most 0.5 $\mu$W. As a result, the electric power required for displaying times can be supplied from a battery having a capacity which is 1/10 times smaller than that required in several years ago. In addition, it is possible to design a timepiece which can operate for 10 years long.

At present, constitutional elements of the electronic timepiece other than the time display device consume an electric power of 3 $\mu$W of 1.5 $\mu$W. $\frac{2}{3}$ of such electric power is consumed by an oscillation circuit and $\frac{1}{3}$ is consumed by timepiece circuit other than the oscillation circuit such as a frequency divider or the like. As a result, at present $\frac{2}{3}$ of the drawback of preventing the battery from becoming long in operative life consists in the electric circuit. In addition, a complementary metal oxide semiconductor integrated circuit constituting the electric circuit of the electronic timepiece consumes that electric power which is proportional to the square of the electric supply source voltage.

A lithium battery can be made so small in size that it can be incorporated into an electronic wrist watch. In addition, the lithium battery can preserve its large electric power capacity for a long time. But, the lithium battery generates a high voltage of 2.6 V to 3.2 V which is not suitable as an electric supply source for the timepiece circuit and has a voltage changeability which is higher than that of a conventional silver battery. As a result, the lithium battery could not be applied to the electronic timepiece so as to utilize its excellent electric characteristics for the purpose of making the electric timepiece long in its operative life.

SUMMARY OF THE INVENTION

An object of the invention, therefore, is to provide an electronic timepiece which can reduce electric power consumed by electric circuits and which has a long operative life.

Another object of the invention is to provide an electronic timepiece which can sufficiently make use of characteristics of a lithium battery and which has a significantly long operative life.

A feature of the invention is the provision of an electronic timepiece comprising a time reference signal supply source for generating a time reference signal, a time keep circuit for preparing a time keep signal on the basis of said time reference signal, a time display device driven by the output delivered from said time keep circuit and displaying times, a battery for supplying energy to said time display device, a voltage converter for converting the voltage supplied from said battery into a low level voltage, and a voltage detection circuit for detecting a level information of said battery voltage, whereby the output signal delivered from said voltage detection circuit causes the output voltage from said voltage converter to change.

DETAILED DESCRIPTION OF THE PREFERRED EMBODIMENT

Figure 1:
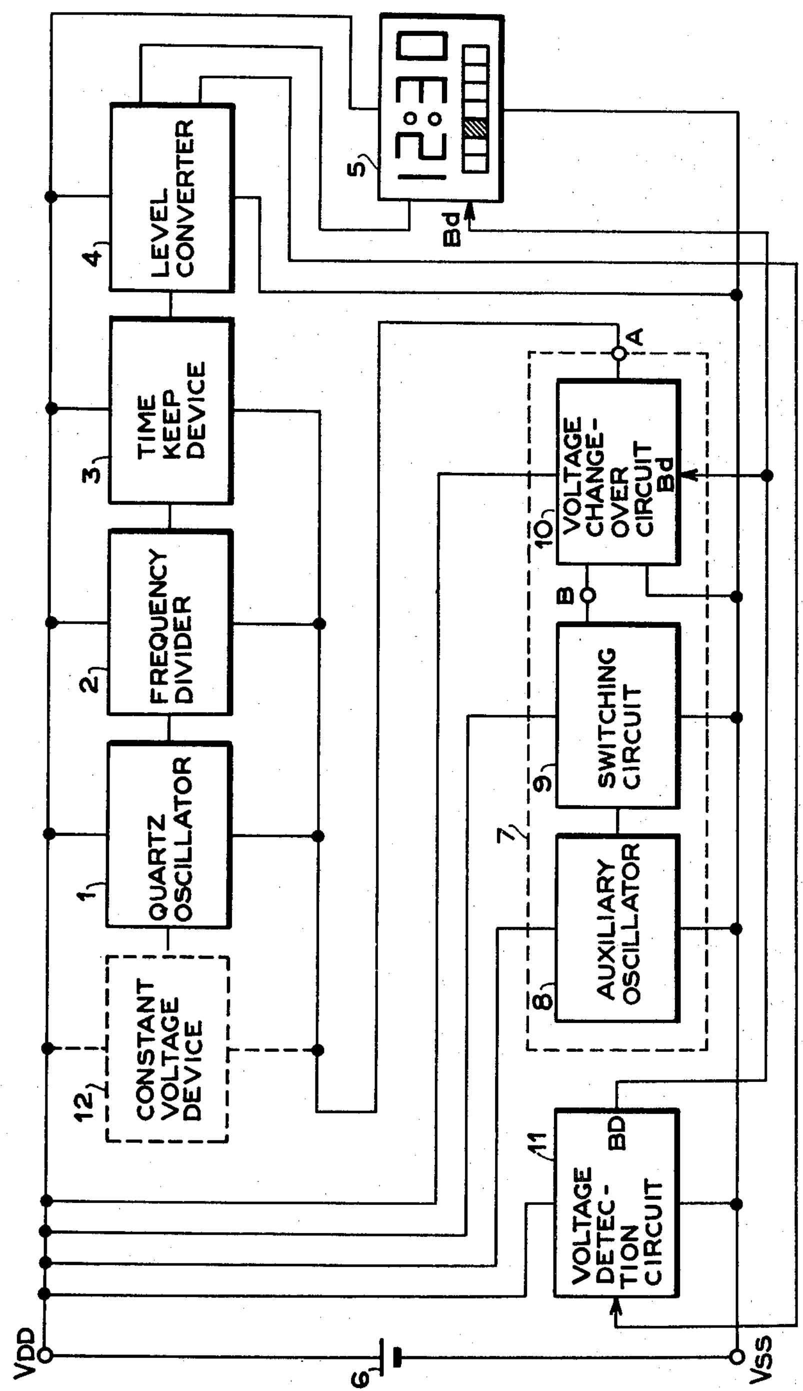
FIG. 1 is a block diagram of one embodiment of an electronic timepiece according to the invention.

Referring to FIG. 1 showing a block diagram of one embodiment of an electronic timepiece according to FIG. 1, reference numeral 1 designates a quartz oscillator which is a time reference signal supply source for generating a time reference signal, 2 a frequency divider for dividing the frequency of the output signal from the quartz oscillator 1 into a time keep signal having a frequency of 1 Hz, 3 a time keep mechanism operative by the time keep signal, 4 a level converter, and 5 a time display device composed of liquid crystal display elements.

The level converter 4 functions to convert voltage levels without changing a signal information to be transmitted when the operational voltage level of the construction up to the time keep mechanism is different from that of the time display device 5.

Reference numeral 6 designates a battery constituting an electric supply source which is a lithium battery having a large electric power capacity, and 7 a voltage converter to be described later and composed of an auxiliary oscillator 8, a switching circuit 9 and a voltage changeover circuit 10. Reference numeral 11 designates a voltage detection circuit which functions to detect the voltage level of the battery 6 by means of a sampling pulse supplied from the level converter 4 and generate a signal having a logic "1" level at a terminal BD when the voltage level of the battery 6 becomes a value lower than a given value.

Figure 2:
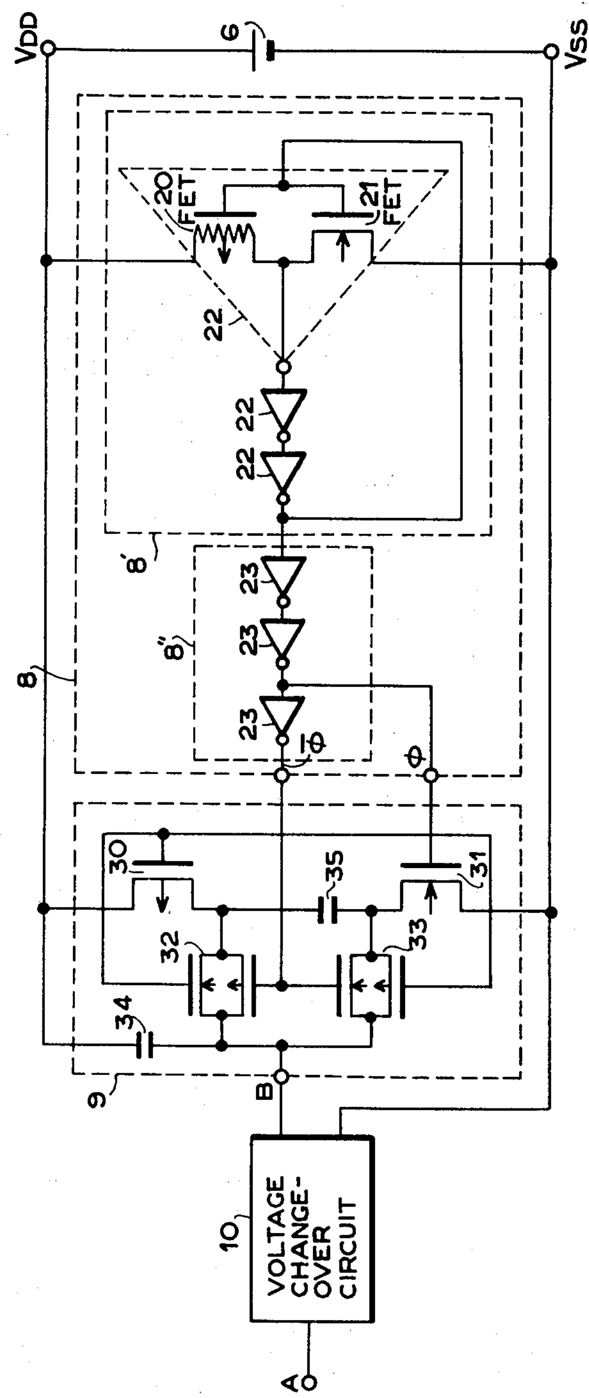
FIG. 2 is a block diagram of the voltage converter shown in FIG. 1.

FIG. 2 shows a block diagram showing the voltage converter 7 shown in FIG. 1. In the present embodiment, the voltage converter 7 functions to lower down its output voltages to a value which is $\frac{1}{2}$ lower than the input voltage. The auxiliary oscillator 8 is composed of a ring oscillator 8' including three inverters 22, 22, 22 connected in a ring and having a low mutual conductance and a wave form shaping circuit 8'' including three inverters 23, 23, 23 and having a low mutual conductance. The inverter 22 is composed of a P channel enhancement FET 20 and an N channel enhancement FET 21. The ring oscillator 8' functions to generate an oscillation output signal $\phi$ whose half period is 3 times longer than a response time of the inverter 22. The oscillation output signal $\phi$ thus generated is subjected to the wave form shaping process by the wave form shaping circuit 8'' to generate relative signals $\phi$, $\overline{\phi}$ which are then supplied to the switching circuit 9.

The ring oscillator 8' does not make use of any condenser and hence can advantageously be incorporated into an integrated circuit. In addition, the use of the inverter 22 having the low mutual conductance ensures a decrease of penetration current to be produced when switching is effected.

Let the oscillation frequency of the auxiliary oscillator 8 be 1000 Hz to 100 Hz, then the current consumed by oscillations is 0.1 $\mu$A to 0.01 $\mu$A.

The switching circuit 9 is composed of four switching elements 30, 31, 32, 33 and two condensers 34, 35 whose capacity values are substantially the same with each other. The switching elements 30 and 31 are formed of a P channel FET and an N channel FET, respectively, while the switching elements 32 and 33 are formed of a pair of P channel FET and N channel FET.

The switching circuit 9 will operate as follows. If $\phi$ is a logic "1" and $\overline{\phi}$ is a logic "0", the switching elements 31, 32 become ON, and as a result, between electric current supply terminals $V_{DD}$ and $V_{SS}$ are connected the condenser 34, switching element 32, condenser 35 and switching element 31 in series to charge the condensers 34 and 35 with the voltage $V_{SS}$.

If $\phi$ is the logic "0" and $\overline{\phi}$ is the logic "1", the switching elements 30, 31 become ON, and as a result, the condensers 34, 35 are connected in parallel across the electric current supply terminals $V_{DD}$ and $V_{SS}$ to produce an output voltage which is $\frac{1}{2}$ lower than the terminal voltage $V_{SS}$. The alternate operation of the signal $\phi$ causes the voltages $V_{SS}$ and $\frac{1}{2}V_{SS}$ to be supplied in a continuous manner.

The voltage change-over circuit 10 is composed of a transmission gate supplied as its input with two level voltages of $V_{SS}$ and $\frac{1}{2}V_{SS}$ and having a control terminal Bd. If the control terminal Bd is the logic level "0", the voltage $\frac{1}{2}V_{SS}$ is delivered from an output terminal A. If the control terminal Bd is the logic level "1", the voltage $V_{SS}$ is delivered from the output terminal A.

Figure 3:
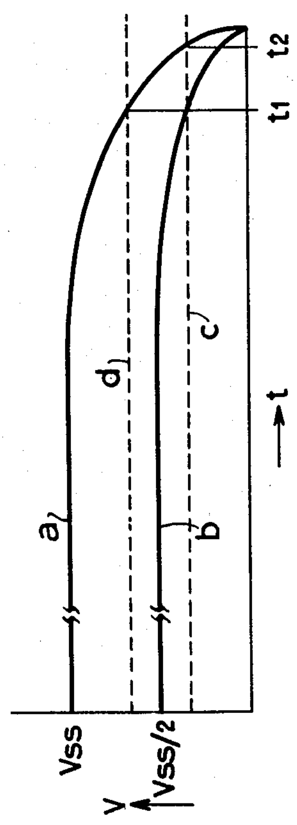
FIG. 3 is a graph showing characteristics of a lithium battery.

FIG. 3 shows a voltage characteristic curve of a lithium battery used in the present invention. In FIG. 3, time t is plotted on abscissa and voltage V is plotted on ordinate. A curve a is a discharge curve of the battery voltage $V_{SS}$ and a curve b is a discharge curve of the voltage level $\frac{1}{2}V_{SS}$ at a point B shown in FIGS. 1 and 2. In FIG. 3, dotted line c shows a lowest possible operative voltage of the timepiece circuit composed of the quartz oscillator 1, frequency divider 2 and time keep mechanism 3. Dotted line d shows a voltage detection level for generating a battery life signal having the logic "1" level at an output terminal BD when the voltage detection circuit 11 becomes operative.

The electronic timepiece constructed as above described will operate as follows. While the battery voltage is high until a time $t_1$, the output terminal BD of the voltage detection circuit 11 is the logic "1" level. As a result, to the output temrinal A of the voltage converter 7 is supplied the $\frac{1}{2}V_{SS}$ voltage from the point B as described with reference to FIG. 2. As a result, the above mentioned timepiece circuit comprising the quartz oscillator 1, frequency divider 2 and time keep mechanism 3 operates with the low electric power by means of the $\frac{1}{2}V_{SS}$ electric supply source. The time display device 5 composed of the liquid crystal display elements receives a time information through the level converter 4 and at the same time functions to display times with the high electric power by means of the $V_{SS}$ electric supply source. After the lapse of time from this condition, if the $V_{SS}$ level shown by the curve a becomes lowered and hence the $\frac{1}{2}V_{SS}$ level shown by the curve b becomes lower than the lowest operative level c, the above mentioned timepiece circuit 1, 2, 3 tends to stop its operation. But, at the same time, at the time $t_1$, the $V_{SS}$ level shown by the curve a becomes lower than the voltage detection level d. As a result, the voltage detection circuit 11 becomes operative to generate a battery life signal having the logic "1" level at its output BD. This causes the control terminal Bd of the voltage change-over circuit 10 to be set to the logic "1" level, thereby directly supplying the voltage $V_{SS}$ to the output terminal A of the voltage converter 7. As a result, the timepiece circuit 1, 2, 3 is kept under its operation. At the same time, the control terminal Bd of the time display device 5 is also set to the logic "1" level, so that a part or all of the time display becomes flickering display condition notifying the user of the timepiece that the battery should be replaced by a new one in near future.

In addition, the timepiece continues its operation from the time of starting the battery life display to a time $t_2$ shown in FIG. 3 at which the voltage $V_{SS}$ level becomes lower than the lowest operative level c and the timepiece stops its operation.

In the present invention, the voltage level supplied from the output terminal A of the voltage converter 7 to the timepiece circuit before and after the operation of the voltage detection circuit 11 is changeable. This changeable voltage level exerts an influence upon the time precision of the quartz oscillator 1. As a result, it is preferable to provide a constant voltage device 12 for holding the voltage supplied to the quartz oscillator 1 at a constant level.

In the present embodiment, the output voltage of the voltage converter 7 is made changeable for two steps. But, it is possible to change the output voltage of the voltage converter 7 in a stepwise manner for three steps or more in response to lowering of the $V_{SS}$ level by increasing the number of the switching elements and condensers of the switching circuit 9.

In addition, use was made of the ring oscillator 8' of the auxiliary oscillator 8 for the purpose of generating the driving signal $\phi$ of the voltage converter 7. But, the driving signal $\phi$ may be prepared by suitably dividing the frequency of the signal from the quartz oscillator.

As stated hereinbefore, the use of a combination of a voltage converter and a voltage detection circuit according to the invention ensures a low electric power driving of a timepiece circuit. In addition, the voltage detection circuit is made operative at the end of the battery life where the voltage variation becomes large so as to deliver a detection signal which causes the voltage converter to change its output voltage and at the same time causes a time display device to display the end of the battery opertive life. As a result, the invention is capable of providing an electronic timepiece which makes use of a battery having a high electric power capacity and large voltage changeability such as a lithium battery in a highly efficient manner, which is long in operative life and which can display the battery operative life so as to clarify the time when the battery should be replaced by a new one. In addition, the invention is capable of processing information by means of a low voltage derived from a voltage converter and of supplying an optimum voltage to those constitutional elements only of a timepiece which require energy and hence has a number of effects of producing an electronic timepiece on a commercial scale. That is, in the first place, it is possible to effect a matrix driving for positively addressing and driving low voltage liquid crystal display elements by utilizing their threshold value. Secondly, low voltage electrochromism display elements can be driven. Finally, a high voltage can be applied to a FET of a driving circuit for a pulse motor which requires a large current so as to make the driving FET occupying a large space in an integrated circuit chip small in size.

What is claimed is:

1. An electronic timepiece comprising:

(a) a time reference signal supply source for generating a time reference signal;

(b) a time keep circuit for preparing a time keep signal on the basis of said time reference signal;

(c) a time display device driven by the output delivered from said time keep circuit and displaying times;

(d) a power source;

(e) a voltage detection circuit for detecting the voltage of said power source and generating a first signal when the voltage is higher than a predetermined value and a second signal when the voltage is lower than the predetermined value; and (f) a voltage converter connected to the power source for providing an output voltage which is less than the voltage of the power source and including a circuit for connecting the output voltage of said voltage converter to said time reference signal supply source and to said time keep circuit when the first signal from said voltage detection circuit is generated and for connecting the power source directly to said time reference signal supply source and to said time keep circuit when the second signal from said voltage detection circuit is supplied.

2. The electronic timepiece according to claim 1, wherein said power source is a lithium battery.

3. The electronic timepiece according to claim 1, wherein said time display device functions to warn the end of battery life.

4. The electronic timepiece according to claim 1, wherein said voltage converter is composed of an auxiliary oscillator and a voltage change-over circuit.

5. The electronic timepiece according to claim 1, wherein said time display device is directly connected to said battery.

6. The electronic timepiece according to claim 1, wherein a driving signal for said voltage converter is prepared on the basis of a signal having a frequency obtained by dividing the frequency of said time reference signal delivered from said time reference signal supply source.

7. The electronic timepiece according to claim 1, wherein said time reference signal supply source is provided with a constant voltage device to keep said time reference signal at a constant level.

8. The electronic timepiece according to claim 1 wherein said voltage converter is comprised of a switching circuit for providing an output with a lower voltage than the voltage of said battery and a voltage change-over circuit for delivering the output of said switching circuit to said time reference signal supply source and to said time keep device when the first signal from said voltage detection circuit is supplied and for delivering the output of said battery to said time reference signal source and said time keep device when said second signal from said voltage detection circuit is supplied.

* * * * *